Patented Feb. 28, 1950

2,498,812

UNITED STATES PATENT OFFICE 2,498,812

INTAGLIO INK

Lucien Lambelet and Wolfgang Jaeck, Basel, Switzerland, assignors to Ciba Limited, Basel, Switzerland, a Swiss firm No Drawing. Application October 14, 1946, Serial No. 703,094. In Switzerland November 16, 1945

2 Claims. (Cl. 106—22)

According to this invention hydrophobic substances, such as fats, waxes, oils and resins, which are soluble in hydrocarbons, or compositions prepared with such substances, are colored in orange to brown tints by dissolving in the aforesaid substance a monoazo-dyestuff obtained by coupling a diazotized halogen-aniline with 1-aminonaphthalene or an N-alkyl or N-aralkyl derivative thereof.

The dyestuffs to be used in the present process are represented by the general formula

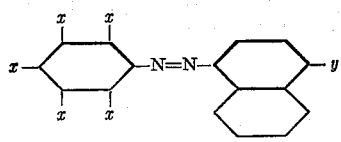

wherein at least one $x$ stands for a halogen atom, for instance, a bromine atom, or, more especially, a chlorine atom, and the other $x$'s stand for hydrogen atoms and wherein $y$ stands more especially for an amino group. In this connection, $y$ may be a free or substituted amino group, the substituents being, for instance, alkyl groups, such as the methyl group or ethyl group; hydroxyalkyl groups, such as the hydroxyethyl group; aralkyl groups, such as the benzyl group.

The dyestuffs used in the process of the invention possess in general a good to very good solubility in the hydrophobic substances mentioned above, so that they can be dissolved without difficulty in liquids such as linseed oil and turpentine oil, and also in high boiling hydrocarbons. In the case of low melting fats and wax compositions the substance to be colored may be melted and the dyestuff stirred into the melt. If, on account of the high melting point of the substance, there is a risk of decomposing the latter or the dyestuff, the substances to be colored need not be melted, if in the coloring process there are also used suitable solvents, such as hydrocarbons (for example) the various benzene, tar, and terpene hydrocarbons) as such or in the form of mixtures, since they may have a good solvent power for fats, resins and waxes and also for the dyestuffs. It is thus possible to dissolve in the same solvent first the dyestuff and then the hydrophobic substance or vice versa.

The colorings produced by the invention are in some cases distinguished by remarkable properties of fastness. In addition to the generally good solubility of the dyestuffs already referred to, special mention must be made of the fact that the colorings produced therewith are in some cases distinguished by their good fastness to sublimation and resistance to acids, alkalies and tanning agents.

Consequently the uses to which the new coloring process can be applied are very varied. Thus, there may be colored by this process, among other things, waxes (for candles, for instance), oils or fats, and material containing such substances. The process also permits the coloring of materials consisting of or containing hydrophobic substances and capable of producing a coating or film on a solid surface. Examples of such materials are: resin preparations such as inks for intaglio printing; wax preparations such as wood stains, floor waxes, saponified or unsaponified shoe creams. In this process, the materials named are colored, as a rule, in fast orange red to brown tints.

The invention is illustrated in the following example, in which the dyestuff referred to is the monoazo-dyestuff obtained by coupling diazotized 2:5-dichloraniline with 1-aminonaphthalene and producing brown colorings, and in which the parts are by weight and the percentages indicated means per cent. by weight:

Example (a) A brown ink for intaglio printing is prepared by dissolving 5 parts of the deystuff in a mixture of 350 parts of benzene and 400 parts of toluene, and dissolving 250 parts of dammar resin in the resulting solution with the aid of heat, while stirring. Instead of dammar resin any desired natural or artificial resin soluble in hydrocarbons may be used. One may as well first dissolve the resin in the mixture of benzene and toluene and then add the dyestuff.

(b) A brown shoe cream is prepared by melting together 50 parts of carnauba wax and 50 parts of beeswax, adding 0.5 part of the dyestuff to the melt, adding 50 parts of paraffin wax after dissolution of the dyestuff, and finally diluting the whole with 350 parts of turpentine oil.

(c) A partially saponified shoe cream is prepared by boiling a wax composition made up with 50 parts of carnauba wax, 50 parts of beeswax and 50 parts of paraffin wax and colored with 6 parts of the dyestuff, for 20 minutes with 450 parts of a solution of 10 per cent. strength of soap and sodium carbonate.

(d) 0.025 part of the dyestuff is introduced into 30 parts of molten beeswax. A pale-red-brown floor polish is then prepared by diluting the melt with 120 parts of paraffin wax and 350 parts of turpentine oil, warming the mixture and stirring it until is completely homogeneous.

By coloring the molten beeswax with 5 parts of the dyestuff, instead of 0.025 part, and in other respects following the procedure described above, a useful wood stain is obtained.

(e) Brown candles are made by dissolving 0.1 part of the dyestuff in 40 parts of molten stearic acid, then stirring in 60 parts of paraffin wax, and working up the clear homogeneous melt into candles in known manner.

The colorings obtained as described above are distinguished by their good fastness to sublimation and resistance to acids, alkalies and tanning substances.

Similar procedures are followed with the dyestuff obtained from 2:5-dichloraniline and, instead of 1-amino-naphthalene, N-methyl-, N-ethyl, N-β-hydroxyethyl- or N-benzyl-1-amino-naphthalene, or with the dyestuff obtained from any one of the foregoing coupling components and 1-amino-2-chlorobenzene, 1-amino-3-chlorobenzene, 1-amino-4-chlorobenzene, 1-amino-3:4-dichlorobenzene, 1-amino-4-bromobenzene, or 1-amino-2:5-dibromobenzene.

What we claim is:

1. An ink for intaglio printing consisting essentially of a natural resin soluble in hydrocarbons, at least one hydrocarbon in which the resin and the dyestuffs are soluble and at least one dyestuff of the general formula

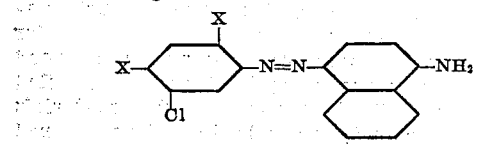

wherein one X stands for a chlorine atom and the other X stands for a hydrogen atom.

2. An ink for intaglio printing consisting essentially of a natural resin soluble in hydrocarbons, at least one hydrocarbon and the dyestuff of the formula

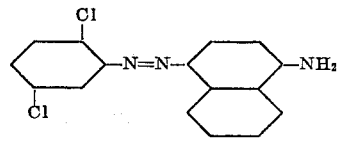

LUCIEN LAMBELET.
WOLFGANG JAECK.

REFERENCES CITED

The following references are of record in the file of this patent:

UNITED STATES PATENTS

| Number | Name | Date |
|---|---|---|
| 1,618,413 | Ellis | Feb. 22, 1927 |
| 2,087,282 | Friedrich et al. | July 20, 1937 |
| 2,090,938 | Conrad | Aug. 24, 1937 |
| 2,138,836 | Brower | Dec. 6, 1938 |
| 2,250,129 | Kopp et al. | July 22, 1941 |
| 2,454,700 | Holik | Nov. 23, 1948 |

OTHER REFERENCES

Wolfe: Printing and Litho Inks, 3rd ed., 1941, pages 264 to 267 and 300.

Certificate of Correction

Patent No. 2,498,812 February 28, 1950

LUCIEN LAMBELET ET AL.

It is hereby certified that errors appear in the printed specification of the above numbered patent requiring correction as follows:

Column 1, line 43, strike out the closing parenthesis after "example"; column 2, line 30, for "deystuff" read *dyestuff*; column 3, line 29, and column 4, line 5, after "hydrocarbon" insert *of the benzene series*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*